(12) United States Patent
Gavant et al.

(10) Patent No.: US 9,860,449 B2
(45) Date of Patent: Jan. 2, 2018

(54) IMAGE ACQUISITION METHOD AND DEVICE TO DIVIDE INTEGRATION TIME FOR IMAGE STABALIZATION

(71) Applicant: Commissariat à l'énergie atomique et aux énergies alternatives, Paris (FR)

(72) Inventors: Fabien Gavant, Coublevie (FR); Laurent Alacoque, Voreppe (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/652,444

(22) PCT Filed: Dec. 17, 2013

(86) PCT No.: PCT/FR2013/053114
§ 371 (c)(1),
(2) Date: Jun. 15, 2015

(87) PCT Pub. No.: WO2014/096670
PCT Pub. Date: Jun. 26, 2014

(65) Prior Publication Data
US 2015/0334304 A1 Nov. 19, 2015

(30) Foreign Application Priority Data
Dec. 17, 2012 (FR) ...................................... 12 62133

(51) Int. Cl.
*H04N 5/232* (2006.01)

(52) U.S. Cl.
CPC ..... *H04N 5/23277* (2013.01); *H04N 5/23248* (2013.01); *H04N 5/23258* (2013.01)

(58) Field of Classification Search
None
See application file for complete search history.

(56) References Cited

U.S. PATENT DOCUMENTS

| | | | |
|---|---|---|---|
| 6,778,210 B1 * | 8/2004 | Sugahara | H04N 5/23248 348/208.4 |
| 6,940,542 B2 | 9/2005 | Kitazawa et al. | |
| 2006/0158523 A1 * | 7/2006 | Estevez | H04N 5/23248 348/208.4 |
| 2006/0216008 A1 | 9/2006 | Iwanaga | |
| 2008/0079814 A1 * | 4/2008 | Nobuoka | H04N 3/155 348/208.99 |
| 2009/0034950 A1 * | 2/2009 | Takagi | G03B 17/00 396/55 |
| 2010/0271512 A1 * | 10/2010 | Garten | G09G 5/06 348/239 |

(Continued)

OTHER PUBLICATIONS

Foi, et al, "A Spatially Adaptive Poissonian Image Deblurring", IEEE, 2005.

(Continued)

*Primary Examiner* — Shabaz Nazrul
(74) *Attorney, Agent, or Firm* — Kevin R. Erdman; Brannon Sowers & Cracraft PC

(57) ABSTRACT

The invention relates to a method wherein at least one output signal of a movement sensor (105; 505) is taken into account for the potential division of an integrating period (T; T") of an image sensor (101; 501) into a plurality of sub-periods (Ti; Ti').

18 Claims, 2 Drawing Sheets

(56) References Cited

U.S. PATENT DOCUMENTS

| | | | |
|---|---|---|---|
| 2010/0295953 A1* | 11/2010 | Torii | G06T 5/003 |
| | | | 348/208.4 |
| 2010/0295954 A1 | 11/2010 | Kotani | |
| 2012/0287309 A1 | 11/2012 | Awatani | |

OTHER PUBLICATIONS

Xu, et al, "A Deburring Technique for Large Scale Motion Blur Images Using a Hybrid Camera", 2010 3rd International on Image and Signal Processing, pp. 806-810, Yantai, China Congress.

Hatanaka, et al, "An Image Stabilization Technology for Digital Still Camera Based on Blind Deconvolution", 2005.

Xie et al, "A New Algorithm for Improving Deblurring Effects and Addressing Spatially-variant Blur Problems for Image Motion Deblurring", 2011 4th International Congress on Image and Signal Processing, pp. 651-655.

Hamamoto, et al, "A Computational Image Sensor with Adaptive Pixel-Based Integration Time", IEEE Journal of Solid-State Circuits, Apr. 2001, pp. 580-585, vol. 36, No. 4.

Petschnigg, et al, "Digital Photography with Flash and No-Flash Image Pairs", Microsoft Corporation, pp. 664-672.

Gavriely, "Handsets: Mpixels, small pixels and image quality challenges", Advasense Image Sensors, Nov. 2008.

Ben-Ezra, et al, "Motion Deblurring Using Hybrid Imaging", Proceedings of the 2003 IEEE Computer Society Conference on Computer Vision and Pattern Recognition, New York, USA.

Kano, et al, "Motion Blur Estimation of Handheld Camera Using Regular and Short Image Exposure Image Pair", pp. 1317-1320.

Levin, et al, "Motion-Invariant Photography", Massachusetts Institute of Technology, Computer Science and Artificial Intelligence Laboratory, 2008, USA.

Ben-Ezra, et al "Motion-Based Motion Deblurring", IEEE Transactions on Pattern Analysis and Machine Intelligence, Jun. 2004, pp. 689-698, vol. 26, No. 6.

Tico, "Multi-Frame Image Denoising and Stabilization", 16th European Signal Processing Conference, 2008, Palo Alto, USA.

European Patent Office, International Search Report for PCT/FR2013/053114, dated Mar. 21, 2014.

Gavant, et al "Perceptual Image Quality Assessment Metric That Handles Arbitrary Motion Blur", Nov. 29, 2011, Grenoble, France.

Jewitt, "Project Pan-STARRS and the Outer Solar System", 2004, Honolulu, USA.

Fergus, et al, "Removing Camera Shake from a Single Photograph", Association for Computer Machinery, Inc., 2006 pp. 787-794, Orissa, India.

Vivirito, et al, "Restoration of Out of Focus Images Based on Circle of Confusion Estimate", 2002, Italy.

Liu, et al, "Simultaneous Image Formation and Motion Blur Restoration via Multiple Capture", 2001, Stanford, USA.

Rav-Acha, et al, "Two Motion-Blurred Images Are Better Than One", Pattern Recognition Letters, Jun. 24, 2004, pp. 312-317, Jerusalem, Israel.

Yuan, et al, "Image Deblurring with Blurred/Noisy Image Pairs", 2007, Hong Kong, China.

Dash, et al, "RBFN based Motion Blur Parameter Estimation", International Conference on Advanced Computer Control, 2009, Orissa, India.

Written Opinion of International Searching Authority, International Search Report for PCT/FR2013/053114, dated Mar. 21, 2014, English Translation.

* cited by examiner

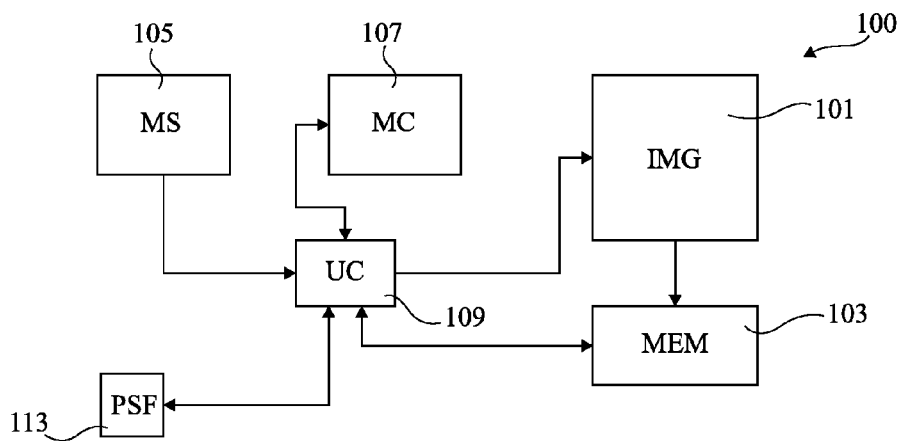
Fig 1
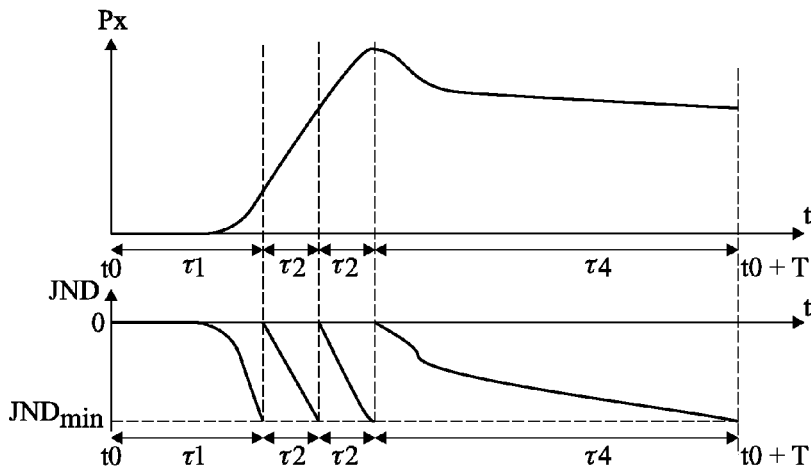
Fig 2A
Fig 2B
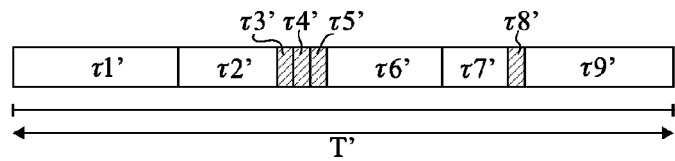
Fig 3
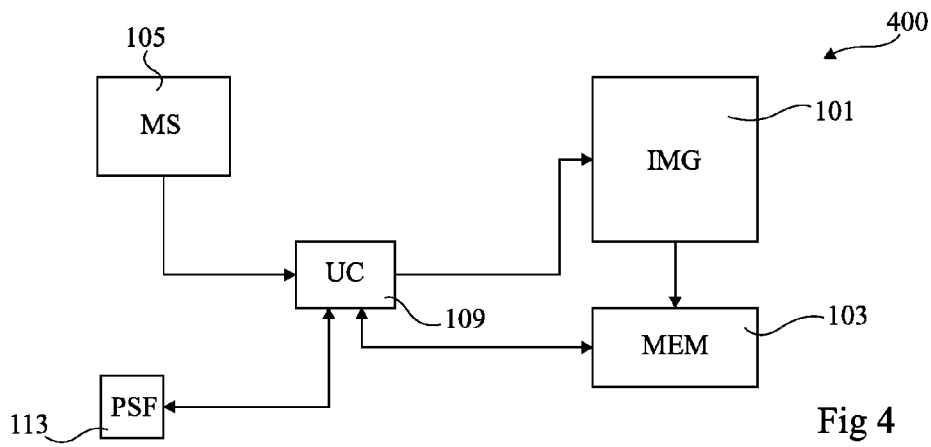
Fig 4

IMAGE ACQUISITION METHOD AND DEVICE TO DIVIDE INTEGRATION TIME FOR IMAGE STABALIZATION

CROSS-REFERENCE TO RELATED APPLICATIONS

The present application is a National Stage of PCT International Application Serial Number PCT/FR2013/053114, filed Dec. 17, 2013, which claims priority under 35 U.S.C. §119 of French Patent Application Serial Number 12/62133, filed Dec. 17, 2012, the disclosures of which are incorporated by reference herein.

BACKGROUND

The present disclosure generally relates to image acquisition methods and devices. It more generally relates to so-called image stabilization methods and devices, that is, aiming at avoiding or limiting the presence of visible artifacts in the image, which may result from unwanted motions of the acquisition device during an image capture.

DISCUSSION OF RELATED ART

Various image stabilization techniques have been provided. Such techniques however all have their specific disadvantages.

SUMMARY

Thus, an embodiment provides a method wherein an integration period of an image sensor is divided into a plurality of sub-periods having their durations selected by taking into account at least one output signal of a motion sensor.

According to an embodiment, at the end of each integration sub-period, an intermediate image acquired by the image sensor is read, and the image sensor is reset.

According to an embodiment, said intermediate images are combined to form a final image.

According to an embodiment, at least one output signal of the motion sensor is taken into account to perform the combination of intermediate images.

According to an embodiment, the combination does not take into account intermediate images having a signal-to-noise ratio lower than a threshold.

According to an embodiment, the combination does not take into account intermediate images acquired during an integration sub-period shorter than a threshold.

According to an embodiment, an image quality index is calculated by taking into account said at least one output signal of the motion sensor.

According to an embodiment, the quality index is taken into account to divide or not the integration period into a plurality of sub-periods.

According to an embodiment, the image sensor and the motion sensor belong to a same image acquisition device.

According to an embodiment, the motion sensor is configured to deliver signals representative of motions of the image acquisition device.

According to an embodiment, the combination takes into account the brightness level in intermediate images to reconstruct a final image with a wide dynamic range.

Another embodiment provides an image acquisition device comprising an image sensor, a motion sensor, and a circuit capable of dividing an integration period of the image sensor into a plurality of integration sub-periods having their durations selected by taking into account at least one output signal of the motion sensor.

According to an embodiment, the motion sensor is configured to deliver signals representative of motions of the image acquisition device.

According to an embodiment, the device further comprises an optical compensation device and a circuit capable of controlling the optical compensation device by taking into account the at least one output signal of the motion sensor.

According to an embodiment, the device comprises no optical compensation device.

BRIEF DESCRIPTION OF THE DRAWINGS

The foregoing and other features and advantages will be discussed in detail in the following non-limiting description of specific embodiments in connection with the accompanying drawings, among which:

FIG. 1 schematically illustrates in the form of blocks an embodiment of an image acquisition device;

FIGS. 2A, 2B, and 3 illustrate the operation of an embodiment of an image acquisition method;

FIG. 4 schematically illustrates in the form of blocks an alternative embodiment of an image acquisition device.

For clarity, the same elements have been designated with the same reference numerals in the various drawings and, further, FIGS. 2A, 2B, 3, and 5 are not to scale. Further, only those elements which are useful to the understanding of the present invention have been shown and will be described.

DETAILED DESCRIPTION

Figure 5:
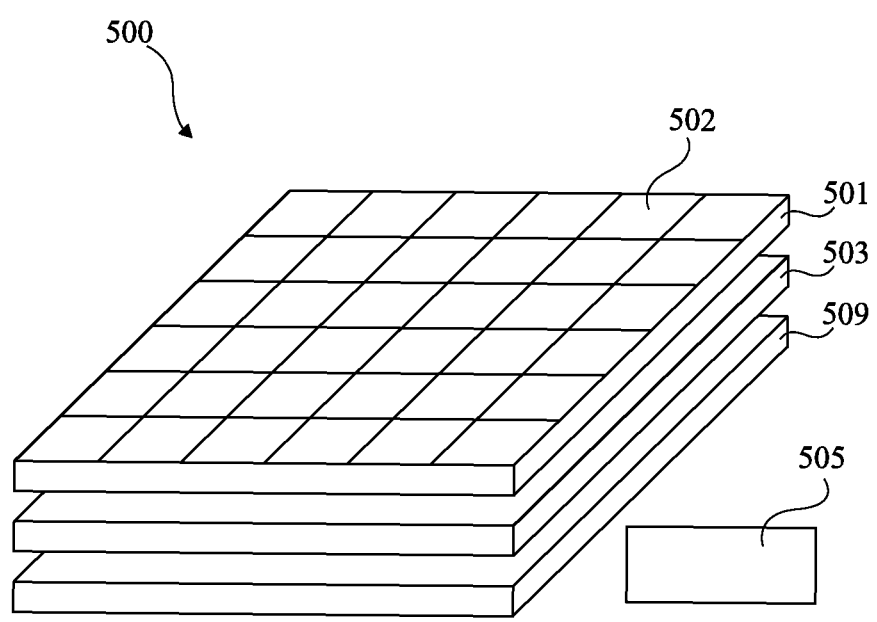
FIG. 5 is a simplified perspective view illustrating an embodiment in integrated form of an image acquisition device.

An image acquisition device, for example, a digital camera, conventionally comprises an image sensor placed behind an optical system, the assembly being assembled in a protection package. To avoid or limit the presence of visible artifacts in the image in case of an unwanted motion of the acquisition device during an image capture (for example, due to the shaking of the user's hand), the acquisition device may comprise an image stabilizer comprising a device for measuring the package motions, or package motion sensor, and a device for optically compensating for such motions. As an example, the motion measurement device may comprise one or a plurality of motion sensors, for example of gyroscope, gyrometer, accelerometer type, etc. and be configured to deliver signals representative of package motions. The optical compensation device may comprise actuation elements configured to displace the image sensor or all or part of the optical system as a response to a control signal. The optical compensation device may be controlled by taking into account the output signals of the motion measurement device so that, during image capture or image acquisition phases, the image projected on the sensor is as independent as possible from the motions of the acquisition device.

A problem is that when the motions of the acquisition device have strong amplitudes, and/or when the focal distance of the optical system is large, the optical compensation device may reach a stop position without succeeding in totally compensating for the measured motions. Further, the response time of the optical compensation system may be too slow to compensate for certain fast motions of the acquisition device, or the compensation system may not be sufficiently accurate to exactly compensate for the measured motions. Thus, even in the presence of an image stabilizer, artifacts, and particularly fuzziness, may be present in the output image, especially when the sensor integration period (or integration time) is long.

It would be desirable to be able to stabilize an image whatever the amplitude, the direction, and the speed of the jerks of the image acquisition device, the focal distance of the optical system, and the sensor integration time (or time of integration of the image on the sensor).

According to an aspect, it is provided, in an image acquisition device comprising an image sensor and a device for measuring motions of the acquisition device, to divide an integration period of the sensor into one or a plurality of integration sub-periods having their durations selected by taking into account output signals of the motion measurement device. More particularly, when, during an image acquisition phase, motions of the acquisition device capable of significantly impacting the image rendering are detected, it is provided to interrupt the sensor integration, to read an intermediate image or frame already integrated on the sensor, and then to reset the sensor at once to start a new integration sub-period, and so on until the sum of the integration sub-periods is equal to the targeted integration period. The intermediate images may be combined or accumulated by taking into account the date output by the motion measurement device, to restore a final image of greater clearness (and of equivalent brightness level) than the image which would have been obtained if the sensor integration had been performed in a single operation.

FIG. 1 schematically illustrates in the form of blocks an embodiment of an image acquisition device 100. Device 100 comprises an image sensor 101 (IMG), which may be assembled in a protection package (not shown), for example, behind an optical system (not shown). An image output of sensor 101 is connected to a memory 103 (MEM) of device 100, where image data acquired by the sensor may be stored, for example, to be submitted to a digital processing and/or while waiting to be recorded in another storage support (not shown). Device 100 further comprises an image stabilization system. In this example, the stabilization system comprises an image stabilizer of the above-mentioned type, that is, comprising a device 105 (MS) capable of measuring motions of device 100 (independently from possible motions of all or part of the scene seen by the sensor) and a device 107 (MC) of for optically compensating for such motions. In this example, the stabilization system comprises a calculation and control circuit 109 (UC), for example, a microcontroller, configured to receive output signals from device 105, and to accordingly control device 107, so that the image projected by sensor 101 is as independent as possible from the motions of device 100. In this example, the stabilization system further comprises a memory area 113 (PSF), which may be separate from memory 103 or included in memory 103, into which circuit 109 can store data relative to the motions of device 100. Circuit 109 is further capable of delivering control signals to image sensor 101, and of reading from and writing into memory 103.

Examples of operating modes of device 100 will now be described in relation with FIGS. 1, 2A, 2B, and 3.

FIG. 2A is a timing diagram schematically showing the time variation, during an image acquisition phase, of equivalent position $P_x$ of device 100, after compensation of the motions of device 100 by device 107. In other words, curve $P_x$ of FIG. 2A does not show all the displacements of device 100 during the integration phase, but shows the portion of these displacements which is not compensated for by device 107, for example, due to their too large amplitude or because they are too fast to be compensated for. Curve $P_x$ may be obtained by comparing the output signals of motion measurement device 105 with the control signals delivered to compensation device 107, while possibly taking into account the time response of compensation circuit 107, or by means of sensors of the displacement of the compensation device itself. It should be noted that for simplification, it has been considered herein that image acquisition device 100 only moves in translation, and in a single direction of the sensor image plane. The described operating modes are however compatible with more complex motions of device 100, provided for these motions to be measurable by device 105.

Before a phase of image acquisition, a targeted integration period T of the sensor is selected, for example, automatically, by taking into account the ambient brightness conditions, or by manual parameterizing by the user.

At a time t0 of beginning of the image acquisition phase, the integration of sensor 101 starts. Starting from time t0 and until the end of the image acquisition phase, device 105 permanently measures the motions of device 100, and transmits motion data to circuit 109 which, as a response, controls optical compensation device 107 so that the image projected on sensor 101 is as independent as possible from the motions of device 100. Simultaneously, circuit 109 determines the equivalent residual motions or displacements of device 100, that is, the motions of device 100 which are not compensated for by device 107 (signal $P_x$).

When circuit 109 detects that the residual displacements of circuit 100 are capable of causing a significant degradation of the rendering of the final image, it makes the interruption of sensor 101 stop, and an intermediate image is read and recorded into memory 103. This marks the end of a first integration sub-period τ1 of the sensor. The sensor is then immediately reset and a second integration sub-period τ2 starts, and so on until the sum of the integration sub-periods is equal to the targeted integration period T. In the shown example, period T is divided into four successive sub-periods τ1, τ2, τ3, and τ4, that is, four intermediate images are read during the image acquisition phase.

During the image acquisition phase, data relative to the residual displacements of device 100 may be recorded in memory area 113.

The intermediate images are combined to reconstruct a final image clearer than the image which would have been obtained if the sensor integration had been performed in a single operation. As an example, to achieve this result, data relative to the residual displacements of device 100 determined by circuit 109 may be taken into account during the intermediate image combination. The intermediate images may for example by offset with respect to one another before being added, to at least partly compensate for these residual displacements. As a variation, other methods of estimating residual displacements and recombining the intermediate images may be used, for example, a method using convolution techniques to have blocks of pixels representative of a same portion of the scene to be acquired coincide.

The reconstruction of the final image can be integrally performed after the reading of the last intermediate image. However, to minimize the quantity of memory necessary to store the intermediate images, a partial reconstruction may be performed after each intermediate reading. As an example, in the case of FIG. 2A, a first intermediate image is read at the end of integration sub-period τ1, and is recorded into memory 103. At the end of integration sub-period τ2, a second intermediate image is read and is directly combined with the first intermediate image, taking into account the residual displacements of device 100 during sub-period τ2. At the end of integration sub-period τ3, a third intermediate image is read and is directly combined with the partially reconstructed image contained in memory 103, taking into account the residual displacements of device 100 during sub-period τ3. At the end of integration sub-period τ4, a fourth intermediate image is read and is directly combined with the partially reconstructed image contained in memory 103, taking into account the residual displacements of device 100 during sub-period τ4. This enables to only have to store a single intermediate image during the acquisition period, independently from the number of integration sub-periods into which period T is divided.

To determine by what extent the residual motions of device 100 are capable of affecting the rendering of the final image, and to decide whether the sensor integration should be interrupted or carried on, circuit 109 may calculate, based on the residual displacement data, the point spread function or matrix of device 100, that is, the deformation caused by the residual deformations of device 100, of a scene selected so as to, in the absence of residual displacements, only illuminate a single pixel of sensor 101. The point spread function may also be used to reconstruct the final image. Indeed, by comparing the states of the point spread function at the end of two successive integration sub-periods, the residual displacements of device 100 during the second sub-period can be determined, and the pixel offsets to be provided during the combination to compensate for these displacements can be deduced therefrom.

In a preferred embodiment illustrated in FIG. 2B, circuit 109 calculates, by taking into account the residual displacement data of device 100, for example, based on the spread point function, a quality index JND of the image being acquired. This index may be used as a criterion by circuit 109, to decide whether the sensor integration should be interrupted or whether it should be carried on.

FIG. 2B shows the time variation, during the image acquisition phase of FIG. 2A, of quality index JND calculated by circuit 109. At time t0 of beginning of the image acquisition phase, index JND is set to a reference value for example, zero. All along the image acquisition phase, circuit 109 recalculates quality index JND by taking into account the residual motions of device 100. When index JND reaches a low threshold $JND_{min}$ (lower than the reference level set at time t0), the sensor integration is interrupted, an intermediate image is read, and a new integration sub-period starts. Before the beginning of the new integration period, index JND is reset to its initial value (zero in this example).

Threshold $JND_{min}$ defines a required quality level set point in each intermediate image. For a given motion sequence during the integration phase, the higher threshold $JND_{min}$, the larger the number of integration sub-periods will be to correspond to this set point, and conversely. The quality of the final image obtained by combination of the intermediate images depends on set point $JND_{min}$.

In a preferred embodiment, quality index JND is a perceptual quality index calculated based on the point spread function by the method described in article "Perceptual Image Quality Assessment Metric That Handles Arbitrary Motion Blur" of Fabien Gavant et al. (Proc. SPIE 8293, Image Quality and System Performance IX, 829314 (Jan. 24, 2012)). According to this method, for a given point spread matrix, the coordinates of the center of gravity of the matrix will be calculated, after which each coefficient of the matrix is weighted by its distance to the center of gravity, and the weighted coefficients are added to obtain a standard deviation E. The quality index is then calculated according to formula $JND=-a*\ln(E+1)+b$, where a and b are adjustment coefficients.

Any other quality index taking into account residual motions of the image acquisition device may however be used.

It should be noted that in the embodiments described in relation with FIGS. 1, 2A, and 2B, in the case of a strong jerk of device 100 during an image acquisition phase, certain integration sub-periods may be very short. The intermediate images acquired during such integration sub-periods may accordingly be relatively noisy, which may adversely affect the quality of the final image obtained by recombination of the intermediate images. In a preferred embodiment illustrated in FIG. 3, to further improve the quality of the final image, it may be provided not to take into account, in the construction of the final image, intermediate images having a signal-to-noise ratio lower than a threshold, and/or having an integration time shorter than a threshold.

FIG. 3 shows the acquisition of an image by a method of the type described in relation with FIGS. 1, 2A, and 2B. In this example, an integration period T' is divided into nine successive integration sub-periods respectively bearing references τ1' to τ9'. As shown in the drawings, sub-periods τ3', τ4', τ5', and τ8' are much shorter than the others, which means that during these sub-periods, motions of device 100 have caused a fast degradation of the quality of the image being acquired. The corresponding intermediate images (in hatchings in FIG. 3) are accordingly relatively noisy. To avoid degrading the quality of the final image, it may be provided not to take into account frames τ3', τ4', τ5', and τ8' in the reconstruction of the final image. To obtain a final image having a brightness level equivalent to the brightness level of the image which would have been obtained if no frame had been suppressed, it may be provided to multiply all the pixel values of the final image by a coefficient or gain proportional to the integration time which has not been taken into account in the construction of the final image (τ3'+τ4'+τ5'+τ8' in this example). As a variation, to compensate for the brightness loss caused by the suppression of noisy frames, the sensor integration may be extended until the sum of the integration sub-periods effectively taken into account in the construction of the final image is equal or close to integration period T'.

FIG. 4 schematically illustrates in the form of blocks an example of an alternative embodiment of an image acquisition device 400. In this example, device 400 comprises the same elements as device 100, except for optical compensation device 107. In other words, acquisition device 400 comprises no image stabilizer, but only a device 105 for measuring the motions of the acquisition device.

The embodiments described in relation with FIGS. 1, 2A, 2B, and 3 are compatible with device 400, with the difference that while, in device 100, the equivalent residual motions of device 100 are taken into account after optical compensation by device 107, in device 400, the motions effectively measured by device 105 are directly taken into account.

An advantage of device 400 is that it comprises no optical compensation device, which decreases its cost, its weight, and its bulk.

FIG. 5 very schematically illustrates an embodiment in integrated form of an image acquisition device 500 of the type described in relation with FIGS. 1 to 4. In this example, device 500 is formed according to a semiconductor chip stack technology, or 3D technology. An image sensor 501 comprising an array of photodiodes 502 is formed in a first stacking level. Photodiodes 502 for example occupy the entire surface area of the stack to capture as much light as possible. A memory 503 capable of containing at least one image acquired by sensor 501 is formed in a second stacking level, under sensor 501. Under memory 503, a control circuit 509 is formed in a third stacking level. Circuit 509 is particularly capable of performing combinations of intermediate images during phases of reconstruction of a final image. Device 500 for example comprises a motion measurement device 505, for example comprising a gyroscope. Device 505 may be integrated in one of the above-mentioned stacking levels. As an example, device 505 may be made in MEMS technology. Device 500 may further comprise an optical compensation device (not shown), for example comprising a liquid lens having an electrically-controllable form. An image stabilization can thus be performed by controlling the lens according to the motion information measured by device 505, while keeping a high integration level.

An advantage of device 500 of FIG. 5 is its low bulk and its low weight.

An advantage of the embodiments described in relation with FIGS. 1 to 4 is that they enable to obtain a clear image whatever the amplitude and the speed of the motions of the image acquisition device, the focal distance of the optical system, and the sensor integration time.

Further, in the described embodiments, the segmentation of the sensor integration period only occurs when motions capable of affecting the quality of the image being acquired are detected. In particular, if no significant motion is detected during an image acquisition phase, the sensor integration period will not be divided, and the final image will be obtained directly, with no intermediate image combination step (that is, in this case, the integration period will be divided into a single integration sub-period). This enables not to introduce noise into the final image by needlessly segmenting the integration period when the acquisition device does not move.

Specific embodiments have been described. Various alterations, modifications, and improvements will readily occur to those skilled in the art.

In particular, the described embodiments are not limited to the specific examples of image acquisition devices described in relation with FIGS. 1, 4, and 5. More generally, the image stabilization method described in relation with FIGS. 1 to 5 may be implemented in any image acquisition device comprising at least one image sensor and one device for measuring the motions of the acquisition device.

Further, so-called high dynamic range image acquisition processes may comprise successive acquisitions of a plurality of images of a same scene with different integration times, and the reconstruction, from these images, of a final image having a homogeneous brightness level, with a wide dynamic range. One may for example select, from each image area, the frames having the best adapted brightness level. In the brightest areas of the scene, frames having a short exposure time may be preferred and in the darkest areas of the scene, frames having a long exposure time may be preferred. Such methods particularly enable to limit overexposure or underexposure phenomena when the scene to be acquired has a high contrast. It may be provided to combine the stabilization method described in relation with FIGS. 1 to 5 with a high-dynamic-range image acquisition method. As an example, the segmentation of the integration time generated by the stabilization method may be used to reconstruct a final high-dynamic-range image and, if necessary, to add segmentation specifically dedicated to obtaining such a high-dynamic-range image.

The invention claimed is:

1. A method wherein an integration period of an image sensor is divided into a plurality of integration sub-periods having their durations selected by taking into account at least one output signal of a motion sensor, and wherein the greater the amplitude of the motion detected by the motion sensor, the shorter the duration of the integration sub-periods, and the lesser the amplitude of the motion detected by the motion sensor, the longer the duration of the integration sub-periods.

2. The method of claim 1, wherein, at the end of each integration sub-period, an intermediate image acquired by the image sensor is read, and the image sensor is reset.

3. The method of claim 2, wherein said intermediate images are combined to form a final image.

4. The method of claim 3, wherein said at least one output signal of the motion sensor is taken into account to perform the combination of said intermediate images.

5. The method of claim 3, wherein said combination does not take into account intermediate images having a signal-to-noise ratio lower than a threshold.

6. The method of claim 3, wherein said combination does not take into account intermediate images acquired during an integration sub-period shorter than a threshold.

7. The method of claim 1, wherein an image quality index is calculated by taking into account said at least one output signal of the motion sensor.

8. The method of claim 7, wherein said image quality index is taken into account to divide or not the integration period into a plurality of sub-periods.

9. The method of claim 1, wherein the image sensor and the motion sensor are part of a same image acquisition device.

10. The method of claim 9, wherein the motion sensor is configured to deliver signals representative of motions of the image acquisition device.

11. The method of claim 3, wherein said combination of said intermediate images takes into account the brightness level in the intermediate images to reconstruct a final image with a wide dynamic range.

12. An image acquisition device comprising an image sensor, a motion sensor, and a circuit capable of dividing an integration period of the image sensor into a plurality of integration sub-periods having their durations selected by taking into account at least one output signal of the motion sensor, wherein the circuit selects durations by taking into account that the greater the amplitude of the motion detected by the motion sensor, the shorter the duration of the integration sub-periods, and the lesser the amplitude of the motion detected by the motion sensor, the longer the duration of the integration sub-periods.

13. The device of claim 12, wherein the motion sensor is configured to deliver signals representative of motions of the image acquisition device.

14. The device of claim 12, further comprising an optical compensation device, and a circuit capable of controlling the optical compensation device by taking into account said at least one output signal of the motion sensor.

15. The device of claim 12, comprising no optical compensation device.

16. The method of claim 2, wherein an image quality index is calculated by taking into account said at least one output signal of the motion sensor.

17. The method of claim 1, wherein the selection of the duration of the integration sub-periods is made during the integration period.

18. The device of claim 12, wherein the circuit selection of the duration of the integration sub-periods is made during the integration period.

\* \* \* \* \*